(12) United States Patent
Saito (10) Patent No.: US 11,429,797 B2
(45) Date of Patent: Aug. 30, 2022

(54) WIRELESS TAG COMMUNICATION DEVICE AND WIRELESSLY TAGGED SHEET

(71) Applicant: TOSHIBA TEC KABUSHIKI KAISHA, Tokyo (JP)

(72) Inventor: Seiji Saito, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/149,205

(22) Filed: Jan. 14, 2021

(65) Prior Publication Data
US 2021/0232779 A1 Jul. 29, 2021

(30) Foreign Application Priority Data

Jan. 28, 2020 (JP) .............................. JP2020-011483

(51) Int. Cl.
 *G06K 7/10* (2006.01)
 *G06K 7/00* (2006.01)
 *G06K 19/07* (2006.01)

(52) U.S. Cl.
 CPC ....... *G06K 7/10019* (2013.01); *G06K 7/0008* (2013.01); *G06K 19/0725* (2013.01)

(58) Field of Classification Search
 CPC ............. G06K 7/10019; G06K 7/0008; G06K 19/0725; G06K 19/0723; G03G 15/5062
 See application file for complete search history.

(56) References Cited

U.S. PATENT DOCUMENTS

| | | | |
|---|---|---|---|
| 2006/0171753 A1* | 8/2006 | Fessler | B41J 11/44 400/76 |
| 2018/0025193 A1* | 1/2018 | Grimaux | G06Q 10/02 235/451 |
| 2018/0239289 A1* | 8/2018 | Takada | G03G 15/6588 |

FOREIGN PATENT DOCUMENTS

JP        2009070186 A    4/2009

* cited by examiner

*Primary Examiner* — Vernal U Brown
(74) *Attorney, Agent, or Firm* — Kim & Stewart LLP (57) ABSTRACT

According to one embodiment, a wireless tag communication device includes a controller configured to acquire, from a wireless tag on a sheet, position information indicating a position of the wireless tag on the sheet, identify the position of the wireless tag on the sheet from the acquired position information, and write information to the wireless tag according to the identified position of the wireless tag on the sheet.

12 Claims, 9 Drawing Sheets

UPPER LEFT PART TAG ID
0000 0000 0000 0000 0000 0FF0

UPPER RIGHT PART TAG ID
0100 0000 0000 0000 0000 0FF0

MIDDLE LEFT PART TAG ID
1000 0000 0000 0000 0FFF 0000

MIDDLE RIGHT PART TAG ID
1100 0000 0000 0000 0FFF 0000

LOWER LEFT PART TAG ID
2000 0000 1000 0000 0000 0000

LOWER RIGHT PART TAG ID
2100 0000 1000 0000 0000 0000

FIG. 13

|  |  | SECOND UPPER DIGIT ||||
|---|---|---|---|---|---|
|  |  | 0 | 1 | 2 | ... | F |
| FIRST UPPER DIGIT | 0 | DATA1 | DATA2 | DATA3 | ... | DATA16 |
|  | 1 | DATA17 | DATA18 | DATA19 | ... | DATA32 |
|  | 2 | DATA33 | DATA34 | DATA35 | ... | DATA48 |
|  | ... | ... | ... | ... | ... | ... |
|  | F | DATA241 | DATA242 | DATA243 | ... | DATA256 |

FIG. 14

WIRELESS TAG COMMUNICATION DEVICE AND WIRELESSLY TAGGED SHEET

CROSS-REFERENCE TO RELATED APPLICATION

This application is based upon and claims the benefit of priority from Japanese Patent Application No. 2020-011483, filed Jan. 28, 2020, the entire contents of which are incorporated herein by reference.

FIELD

Embodiments described herein relate generally to a wireless tag communication device and a wirelessly tagged sheet.

BACKGROUND

There is an image forming apparatus that can print on a sheet that has a wireless tag embedded therein or attached thereto. Such an image forming apparatus has a wireless tag communication device that writes information to the wireless tag. The wireless tag communication device writes information to the wireless tag of a sheet being conveyed from a storage location for printing or other processing.

The wireless tag communication device writes information to the wireless tag according to the position of the wireless tag on the sheet. If the position of the wireless tag is unknown, the wireless tag communication device may not be able to write information to the tag.

DETAILED DESCRIPTION

At least one embodiment of the present disclosure provides a wireless tag communication device that is capable of writing information to wireless tags according to the particular position of the wireless tag on a sheet being processed. A sheet tagged with multiple wireless tags is also disclosed.

In general, according to one embodiment, a wireless tag communication device includes a controller configured to: acquire, from a wireless tag on a sheet, position information indicating a position of the wireless tag on the sheet; identify the position of the wireless tag on the sheet from the acquired position information; and write information to the wireless tag according to the identified position of the wireless tag on the sheet.

Hereinafter, a wireless tag communication device and a wireless tagged sheet of an example embodiment will be described with reference to the drawings. In the following description, aspects having the same or substantially similar functions are denoted by the same reference numerals. Furthermore, the description of the duplicated aspects may be omitted.

A side view of an image forming apparatus according to an embodiment will be described with reference to FIG. 1.

Figure 1:
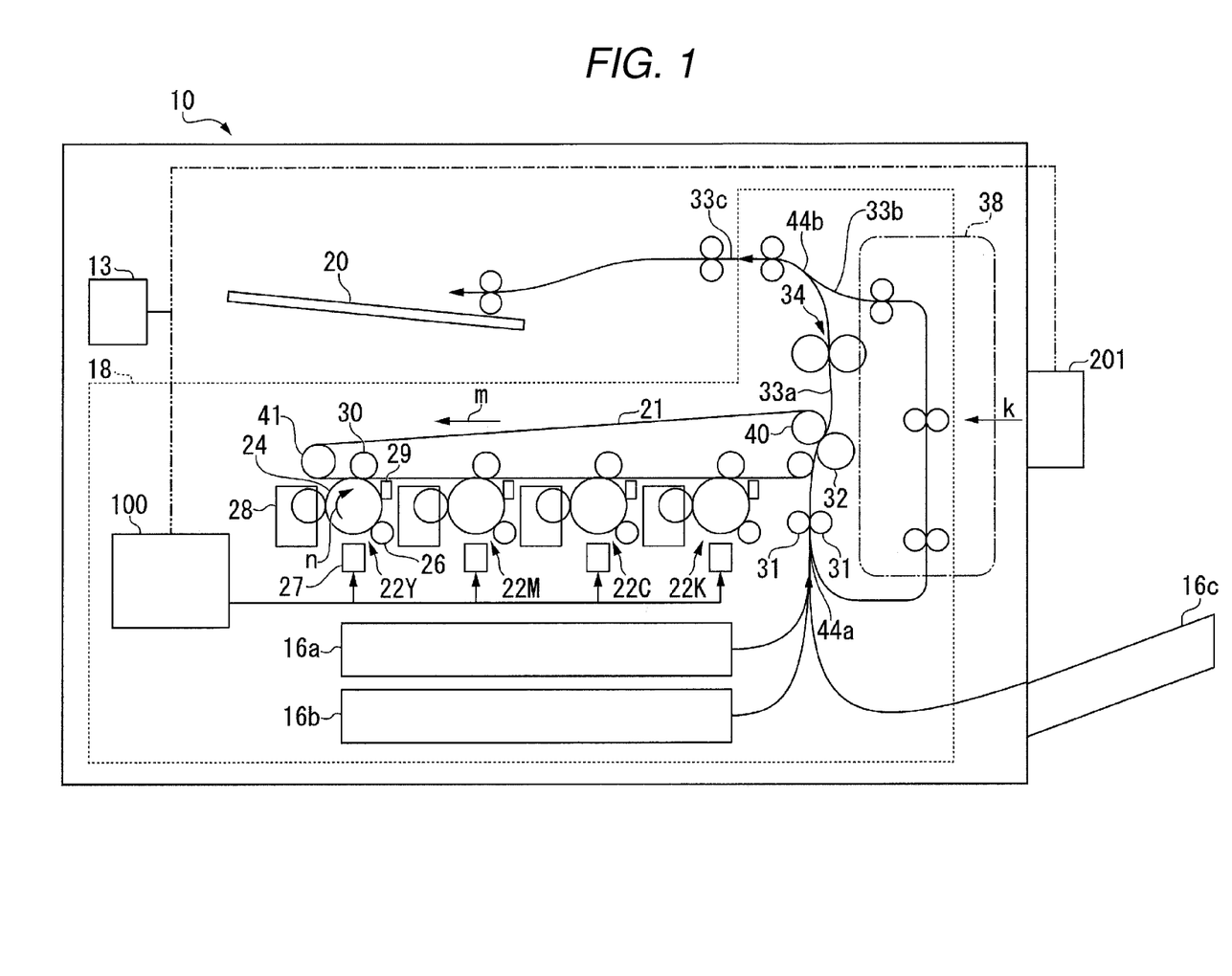
FIG. 1 is a side view of an image forming apparatus according to an embodiment.

In FIG. 1, the image forming apparatus 10 includes a control panel 13, a wireless tag communication device 201, and a printer unit 18. The printer unit 18 includes a control unit 100, sheet feed cassettes 16a and 16b, and the like. The control unit 100 controls the control panel 13, the wireless tag communication device 201, and the printer unit 18. The control unit 100 controls the sheet conveyance in the printer unit 18. The control of sheet conveyance is to control the sheet conveyance timing, the sheet stop position, the sheet conveyance speed, and the like.

The control panel 13 includes an input key and a display unit. For example, the input key receives an input from the user. For example, the display unit is a touch panel type. The display unit receives an input from the user and displays the input to the user. For example, the control panel 13 displays items related to the operation of the image forming apparatus 10 on the display unit so that the various operating parameters and functions can be set by the user. The control panel 13 notifies the control unit 100 of the user inputs and selections.

The sheet feed cassettes 16a and 16b store tagged sheets. In this context, tagged sheets are sheets that have been provided with wireless tags attached thereto or embedded therein. The sheet feed cassettes 16a and 16b can, of course, store sheets on which the wireless tags are not provided (untagged sheets). In the following description, unless otherwise specified, each sheet is a tagged sheet. A material such as paper or a plastic film can be used for the sheets.

The printer unit 18 performs an image forming operation. For example, the printer unit 18 forms an image on a sheet corresponding to image data provided to the printer unit 18. In the following description, forming an image on a sheet is also referred to as printing. The printer unit 18 includes an intermediate transfer belt 21. The printer unit 18 supports the intermediate transfer belt 21 with a driven roller 41, a backup roller 40, and the like. The printer unit 18 rotates the intermediate transfer belt 21 in the direction of arrow m.

The printer unit 18 includes four sets of image forming stations 22Y, 22M, 22C and 22K. The image forming stations 22Y, 22M, 22C, and 22K are for Y (yellow), M (magenta), C (cyan), and K (black) image formation, respectively. The image forming stations 22Y, 22M, 22C and 22K are arranged below the intermediate transfer belt 21 and along the rotation direction of the intermediate transfer belt 21.

Hereinafter, out of the image forming stations 22Y, 22M, 22C, and 22K, the Y (yellow) image forming station 22Y will be described as an example. The image forming stations 22M, 22C, and 22K have the same configuration as the image forming station 22Y, and thus the detailed description thereof will be omitted.

The image forming station 22Y includes a charger 26, an exposure scanning head 27, a developing device 28, and a photoconductor cleaner 29. The charger 26, the exposure scanning head 27, the developing device 28, and the photoconductor cleaner 29 are arranged around the photosensitive drum 24 that rotates in the direction of arrow n.

The image forming station 22Y includes a primary transfer roller 30. The primary transfer roller 30 faces the photosensitive drum 24 via the intermediate transfer belt 21.

The image forming station 22Y charges the photosensitive drum 24 using the charger 26 and then selectively exposes the charged photosensitive drum 24 using the exposure scanning head 27. The image forming station 22Y thus forms an electrostatic latent image on the photosensitive drum 24. The developing device 28 develops the electrostatic latent image on the photosensitive drum 24 using a two-component developer formed of toner and carrier.

The primary transfer roller 30 transfers the toner image formed on the photosensitive drum 24 to the intermediate transfer belt 21. The image forming stations 22Y, 22M, 22C, and 22K each form a color toner image on the intermediate transfer belt 21 using a primary transfer roller 30. The color toner image is formed by sequentially superposing Y (yellow), M (magenta), C (cyan), and K (black) toner images on each previously formed toner image. The photoconductor cleaner 29 removes any toner remaining on the photosensitive drum 24 after the primary transfer process.

The printer unit 18 includes a secondary transfer roller 32. The secondary transfer roller 32 faces the backup roller 40 via the intermediate transfer belt 21. The secondary transfer roller 32 transfers all the color toner images on the intermediate transfer belt 21 to the sheet at once. In the following description, the term "toner image" may be either a color toner image or a toner image of only one color. The toner image may also be a toner image using decolorable-type toner.

A conveyance path 33a is the conveyance path from a confluence portion 44a to a branch portion 44b. The conveyance path 33a is one example of a conveyance unit. A conveyance path 33b is the conveyance path that passes through the inside of a double-side printing device 38 (also referred to as a reversing unit 38) and is the conveyance path from the branch portion 44b back to the confluence portion 44a. A conveyance path 33c is the conveyance path from the branch portion 44b to a sheet discharge tray 20.

The leading edge of a sheet picked up from the sheet feed cassette 16a, the sheet feed cassette 16b, or a manual feed tray 16c is abutted against the nip portion formed by two registration rollers 31. The angle of the sheet is corrected at the registration rollers 31. The control unit 100 starts the rotation of the registration rollers 31 in accordance with the position of the toner image on the rotating intermediate transfer belt 21 and moves the sheet to the position of the secondary transfer roller 32 at a timing appropriate to receive the toner image at the secondary transfer roller 32. The control unit 100 thus causes the transfer of the toner image formed on the intermediate transfer belt 21 onto the sheet at the secondary transfer roller 32. The control unit 100 then causes the sheet to be conveyed along the conveyance path 33a and a fixing device 34 to fix the toner image on the sheet to form an image thereon. The control unit 100 then causes the sheet to be discharged by conveying the sheet to the conveyance path 33c.

In the case of double-sided printing, the control unit 100 causes the sheet having an image formed on its front surface to be conveyed part way along the conveyance path 33c but not all the way to discharge tray 20. After the entire sheet has passed through the branch portion 44b, the control unit 100 causes the sheet to reverse direction and be conveyed to and along the conveyance path 33b. After that, the control unit 100 causes the sheet to be conveyed to the confluence portion 44a via the conveyance path 33b in the double-sided printing device 38 and returns the sheet to the conveyance path 33a via the registration rollers 31 again. Then, the control unit 100 then forms a toner image on the back surface of the sheet and then fixes the toner image to the sheet using the fixing device 34. The control unit 100 then causes the sheet to be discharged by causing the sheet to be conveyed to and along the conveyance path 33c.

The wireless tag communication device 201 can communicate with the control unit 100. The wireless tag communication device 201 acquires information from (reads) the wireless tag or writes information to the wireless tag by communicating with the wireless tag on the sheet. The wireless tag in this embodiment is, for example, a Radio Frequency Identifier (RFID) tag. The wireless tag communication device 201 transmits a radio wave in the direction of arrow k. The wireless tag that receives a radio wave (interrogation signal) from the wireless tag communication device 201 returns a radio wave (response signal) to the wireless tag communication device 201. The wireless tag communication device 201 receives radio waves from all the wireless tags provided on a sheet.

In the image formed in the printer unit 18, an electrostatic latent image is formed on the photosensitive drum 24 from the exposure scanning head 27 before being secondarily transferred by the secondary transfer roller 32. The electrostatic latent image formed on the photosensitive drum 24 is initially transferred (primary transfer) to the intermediate transfer belt 21 as a toner image. Then, the toner image on the intermediate transfer belt 21 is transferred (secondary transfer) to a tagged sheet that has been conveyed to the registration rollers 31.

Next, a block diagram of the image forming apparatus of the embodiment will be described with reference to FIG. 2.

Figure 2:
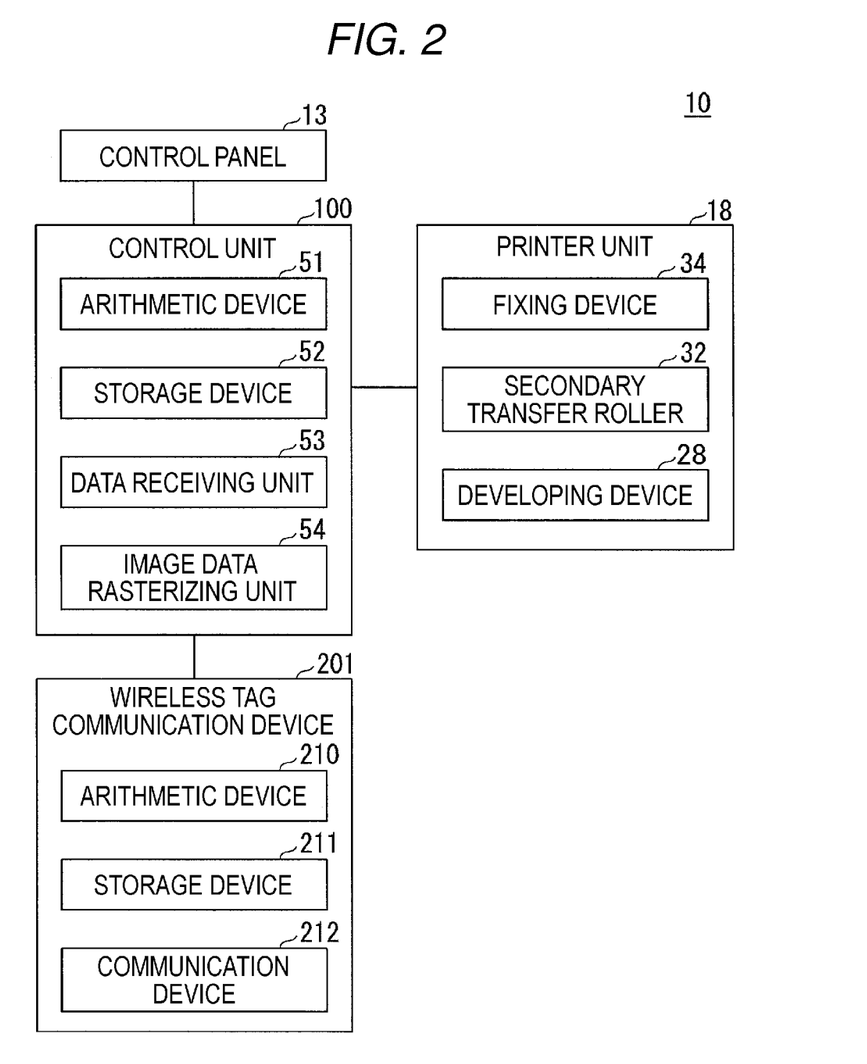
FIG. 2 is a block diagram of an image forming apparatus and a wireless tag communication device according to an embodiment.

In FIG. 2, the image forming apparatus 10 includes the control unit 100, the control panel 13, the printer unit 18, and the wireless tag communication device 201.

The control unit 100 includes an arithmetic device 51 and a storage device 52. The arithmetic device 51 controls the control panel 13, the printer unit 18, and the wireless tag communication device 201 according to the image processing program stored in the storage device 52.

The arithmetic device 51 is, for example, a central processing unit (CPU), an application specific integrated circuit (ASIC), or the like. The storage device 52 is a read only memory (ROM), a random access memory (RAM), a hard disk drive (HDD), a solid-state drive (SSD), or the like.

A data receiving unit 53 receives print data corresponding to an image to be printed (for example, data described in a page description language) from a host, such as a personal computer (PC), and stores the received print data in the storage device 52. An image data rasterizing unit 54 determines printing conditions from the print data stored in the storage device 52 and rasterizes the print data for printing by the printer unit 18 (for example, raster data is provided to the printer unit 18), and then stores the rasterized data in the storage device 52.

The printer unit 18 includes the fixing device 34, the secondary transfer roller 32, and the developing device 28. The printer unit 18 forms an image on a sheet based on the data stored in the storage device 52 by the image data rasterizing unit 54.

The wireless tag communication device 201 includes an arithmetic device 210, a storage device 211, and a communication device 212. The arithmetic device 210 is, for example, a central processing unit (CPU), an application specific integrated circuit (ASIC), or the like. The storage device 211 is a read only memory (ROM), a random access memory (RAM), or the like. The storage device 211 stores an ID for identifying the wireless tag(s). The communication device 212 acquires information from the wireless tag or writes information to the wireless tag. The arithmetic device 210 may be referred to as a controller or a control circuit in some instances.

Figure 3:
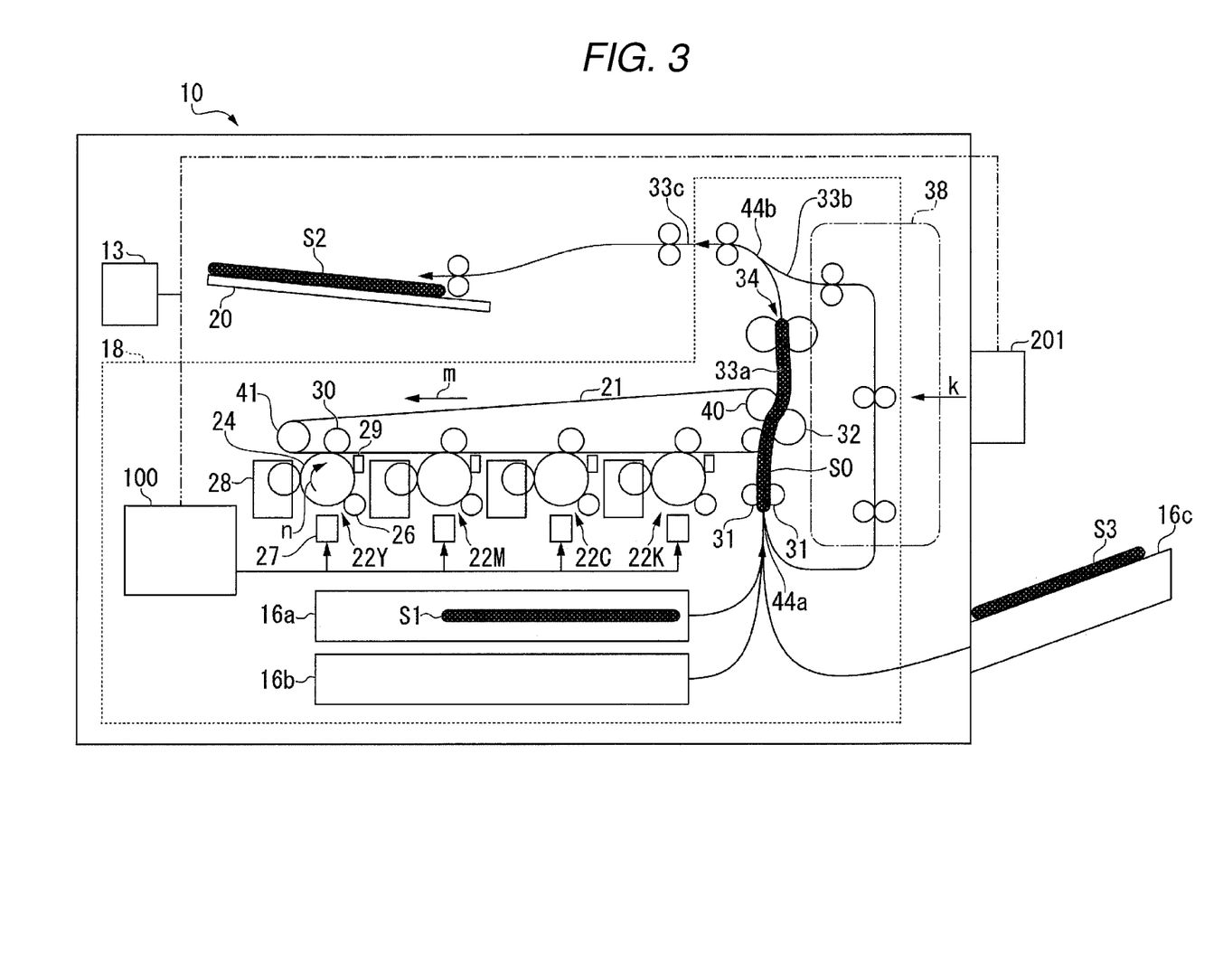
FIG. 3 depicts examples of positions at which a sheet can be in an image forming apparatus.

Next, the control of writing information (data) to a wireless tag according to the position of the wireless tag on the sheet will be described. FIG. 3 is a diagram showing an example of the possible positions of sheets in the image forming apparatus 10. In FIG. 3, a sheet S1 is a sheet in the sheet feed cassette 16a. A sheet S2 is a sheet on the sheet discharge tray 20. A sheet S3 is a sheet on the manual feed tray 16c.

A sheet S0 is a sheet which is being conveyed on the conveyance path 33a. In the present embodiment, the sheet including the wireless tag to which information is to be written may be referred to as "target sheet." Furthermore, in this embodiment the target sheet is a sheet that is being conveyed on the conveyance path 33a (that is a sheet generally in the position of sheet S0 in FIG. 3).

In the state shown in FIG. 3, the wireless tag communication device 201 transmits a radio wave in the direction of arrow k. Any wireless tag that receives the radio wave at sufficient strength returns a response radio wave to the wireless tag communication device 201. The wireless tag communication device 201 thus receives radio waves (responses) from the wireless tag(s) provided on the target sheet.

Figure 4:
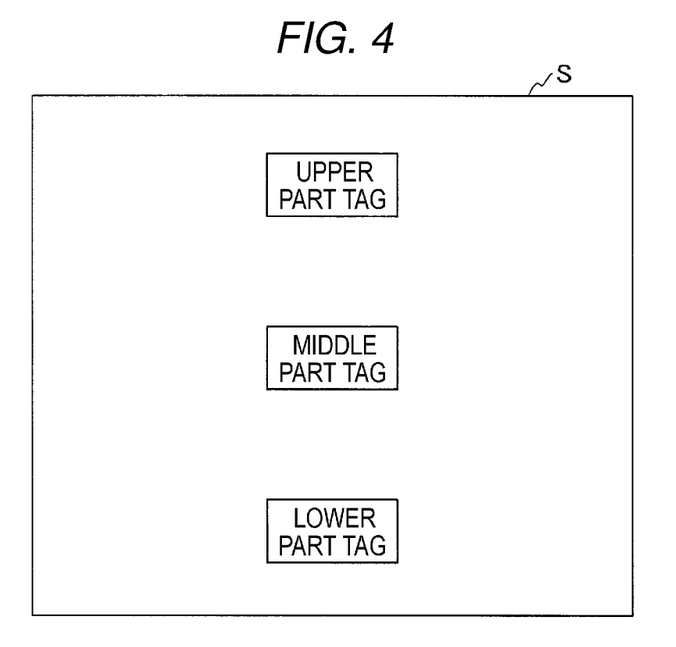
FIG. 4 depicts examples of the positions on a sheet for wireless tags.
Figure 5:
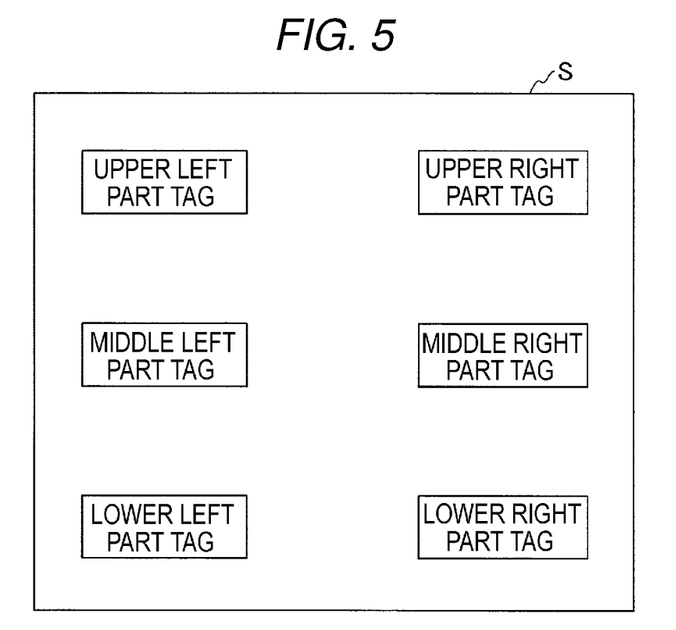
FIG. 5 depicts examples of the positions on a sheet of wireless tags.

FIGS. 4 and 5 are diagrams showing examples of possible positions of wireless tags provided on a sheet. In FIGS. 4 and 5, the upward page direction for the sheet S is the conveyance direction. The sheet shown in FIG. 4 is provided with wireless tags at three different positions on the sheet: the upper part, the middle part, and the lower part. The wireless tag provided at the upper part is referred to as an upper part tag and its ID is referred to as an upper part tag ID. The wireless tag provided at the middle part is referred to as a middle part tag and its ID is referred to as a middle part tag ID. The wireless tag provided at the lower part is referred to as a lower part tag and its ID is referred to as a lower part tag ID.

The sheet S shown in FIG. 5 is provided with wireless tags at six positions: the upper right part, the middle right part, the lower right part, the upper left part, the middle left part, and the lower left part. The wireless tag provided at the upper right part is referred to as an upper right part tag and its ID is referred to as an upper right part tag ID. The wireless tag provided at the middle right part is referred to as a middle right part tag and its ID is referred to as a middle right part tag ID. The wireless tag provided at the lower right part is referred to as a lower right part tag and its ID is referred to as a lower right part tag ID. The wireless tag provided at the upper left part is referred to as an upper left part tag and its ID is referred to as an upper left part tag ID. The wireless tag provided at the middle left part is referred to as a middle left part tag and its ID is referred to as a middle left part tag ID. The wireless tag provided at the lower left part is referred to as a lower left part tag and its ID is referred to as a lower left part tag ID.

Each of the upper part tag, the middle part tag, the lower part tag, the upper right part tag, the middle right part tag, the lower right part tag, the upper left part tag, the middle left part tag, and the lower left part tag can be more simply referred to as a wireless tag. Likewise, each of the upper part tag ID, the middle part tag ID, the lower part tag ID, the upper right part tag ID, the middle right part tag ID, the lower right part tag ID, the upper left part tag ID, the middle left part tag ID, and the lower left part tag ID can be referred to as an ID.

Each wireless tag includes a storage unit that stores an ID. The wireless tag can provide the ID stored in the storage unit to another device, such as the wireless tag communication device 201. When the wireless tag communication device 201 transmits an interrogation wave in the direction of arrow k (see FIG. 3) a plurality of wireless tags provided on a sheet S may respond. That is, the wireless tags may each provide their respective IDs, and the wireless tag communication device 201 may thus acquire the IDs of a plurality of wireless tags nearly simultaneously.

The ID stored in the wireless tag provided on the sheet S of this embodiment includes position information indicating the position of the responding tag on the sheet S. The position information complies with a predetermined rule permitting conversion of the ID (or a portion thereof) to position information. The wireless tag communication device 201 thus acquires the ID of the wireless tag as position information. Since the position information complies with a predetermined rule, the wireless tag communication device 201 can acquire the position information of the wireless tag and can specify the position of the responding wireless tag.

With this, even if the wireless tag communication device 201 acquires the IDs of a plurality of wireless tags, it is still possible to write information to the wireless tags according to the particular positions of the wireless tags on the sheet. For example, in the case of the sheet S of FIG. 4, the wireless tag communication device 201 writes certain data (referred to as "upper part data") specifically to the upper part tag. Similarly, the wireless tag communication device 201 writes certain data (referred to as "middle part data") to the middle part tag. The wireless tag communication device 201 writes certain data (referred to as "lower part data") to the lower part tag.

Next, the position information will be described in more detail. In the present embodiment, there are possible controls that regard the ID acquired as position information as a numerical value and possible controls that regard the acquired ID as a bit string. First, a first control type (referred to as "first control") that regards the ID as a numerical value will be described. The first control is control for specifying the position of the wireless tag by a remainder when the acquired ID is divided by the number of wireless tags provided on the sheet S.

In the description of the first control, the sheet S shown in FIG. 4 will be used as an example. The sheet S shown in FIG. 4 is provided with three wireless tags. Therefore, in the first control, the position of the wireless tag is specified by the remainder when the acquired ID value is divided by 3.

Figure 6:
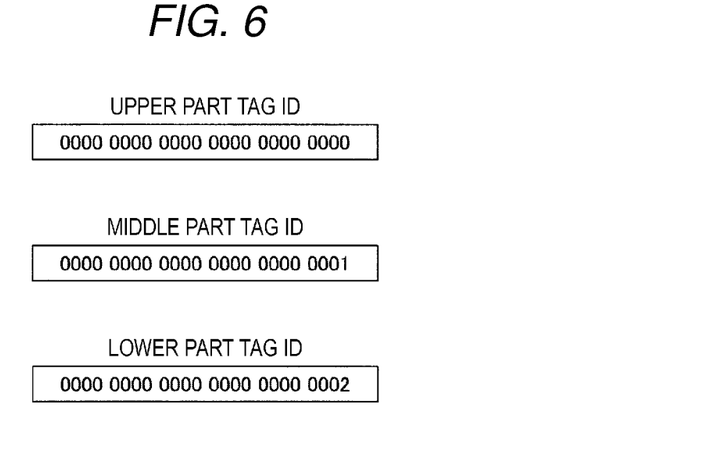
FIG. 6 depicts examples of an upper part tag ID, a middle part tag ID, and a lower part tag ID.

FIG. 6 is a diagram showing an example of the upper part tag ID, the middle part tag ID, and the lower part tag ID. Not only the tag ID of FIG. 6 but hexadecimal tag IDs discussed further below can also be utilized). Each tag ID in FIG. 6 is composed of 24 digits. Therefore, the tag ID is 12-byte data.

When the ID shown in FIG. 6 is regarded as a numerical value, the upper part tag ID is 0 as a numerical value. The middle part tag ID is 1. The lower part tag ID is 2. In this way, when the ID of the wireless tag provided at the upper part is divided by 3, the remainder is 0. When the ID of the wireless tag provided at the middle part is divided by 3, the remainder is 1. When the ID of the wireless tag provided at the lower part is divided by 3, the remainder is 2.

The wireless tag communication device 201 determines that the wireless tag with the remainder of the ID of 0 is an upper part tag and writes the upper part data. The wireless tag communication device 201 determines that the wireless tag with the remainder of the ID of 1 is a middle part tag and writes the middle part data. The wireless tag communication device 201 determines that the wireless tag with the remainder of the ID of 2 is a lower part tag and writes the lower part data.

When writing data on a plurality of sheets, by setting the upper part tag ID of the wireless tag provided on the sheet to write next information to 3, the middle part tag ID to 4, and the lower part tag ID to 5, the respective remainders become 0, 1, and 2. Further, by setting the upper part tag ID of the wireless tag provided on the sheet for writing the following information to 6, the middle part tag ID to 7, and the lower part tag ID to 8, the respective remainders become 0, 1, and 2. By similarly assigning IDs thereafter, the wireless tag communication device 201 can specify the position information on a plurality of sheets while still keeping all the IDs different from each other across a plurality of sheets.

In this way, the wireless tag communication device 201 can identify the sheet location of each wireless tag simply by determining the remainder when the ID of the wireless tag is divided by the number of wireless tags on each sheet. Thereby, the wireless tag communication device 201 can write data to a wireless tag according to its position on the sheet.

Figure 7:
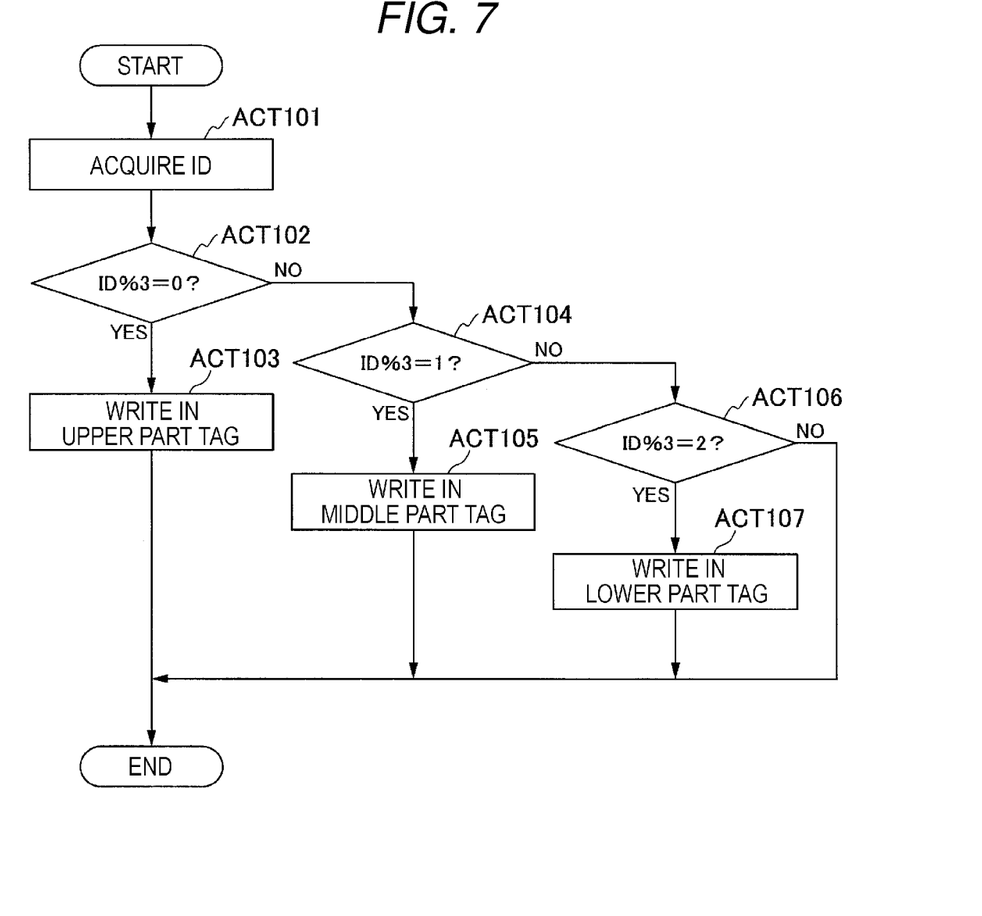
FIG. 7 is a flowchart of a first control process of a tag writing operation.

FIG. 7 is a flowchart showing the flow of first control by the wireless tag communication device 201. The processing shown in FIG. 7 is started by an instruction from the control unit 100. In addition, this flowchart shows the flow when the ID is acquired three times. The wireless tag communication device 201 acquires an ID (ACT 101). The wireless tag communication device 201 determines whether or not the remainder when the acquired ID is divided by 3 is 0 (ACT 102). In FIG. 7, the symbol, "%" is a remainder operator. When the remainder is 0 (ACT 102: YES), the upper part data is written in the upper part tag (ACT 103) and the process ends.

If the remainder is not 0 in ACT 102 (ACT 102: NO), the wireless tag communication device 201 determines whether or not the remainder when the acquired ID is divided by 3 is 1 (ACT 104). If the remainder is 1 (ACT 104: YES), the middle part data is written in the middle part tag (ACT 105) and the process ends.

When the remainder is not 1 in ACT 104 (ACT 104: NO), the wireless tag communication device 201 determines whether or not the remainder when the acquired ID is divided by 3 is 2 (ACT 106). If the remainder is 2 (ACT 106: YES), the lower part data is written in the lower part tag (ACT 107) and the process ends.

When the remainder is not 2 in ACT 106 (ACT 106: NO), the wireless tag communication device 201 ends the process without doing anything. Note that the remainder when divided by 3 is generally 0 to 2, but there is a system in which the remainder can be a negative number when the number (ID) to be divided is a negative number. For example, if ID is −13, then −13=3×(−4)−1=3×(−5)+2 can be taken as an example, the latter "+2" is a general remainder, but a system with "−1" as a remainder can also be used. In this case, it cannot be denied that the acquired ID may be abnormal, so the process is terminated without doing anything.

In the first control described above, the entire ID is regarded as a numerical value, but the present disclosure is not limited thereto. For example, only four digits from the fifth lower digit to the eighth lower digit of the ID may be extracted and these four digits may be regarded as a numerical value.

In the flowchart shown in FIG. 7, the same ID may be acquired multiple times in ACT 101. When the ID of the wireless tag whose data was already written is acquired, the wireless tag communication device 201 ends the process without writing again. When the IDs are acquired from a plurality of wireless tags, the wireless tag communication device 201 writes the data to any wireless tag that was not previously written.

Next, a second control type (hereinafter referred to as "second control") that regards the ID as a numerical value will be described. The second control is control for specifying the position of the wireless tag based on the magnitude relationship of the ID.

In the description of the second control, the sheet S shown in FIG. 4 will again be used as an example. The sheet S shown in FIG. 4 is provided with three wireless tags. Therefore, in the second control, the position of a wireless tag can be specified by acquiring the IDs from all three wireless tags on the sheet.

Figure 8:
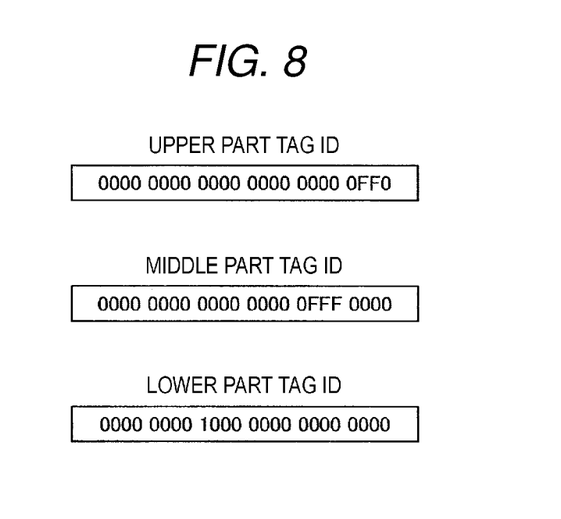
FIG. 8 depicts examples of an upper part tag ID, a middle part tag ID, and a lower part tag ID.

FIG. 8 is a diagram showing another example of the upper part tag ID, the middle part tag ID, and the lower part tag ID. When the ID shown in FIG. 8 is regarded as a numerical value, the upper part tag ID is FF0. The middle part tag ID is FFF0000. The lower part tag ID is 100000000000. Therefore, the magnitude relationship of these numerical values is:

upper part tag ID<middle part tag ID<lower part tag ID.

According to this control process, the wireless tag communication device 201 determines that the wireless tag with the smallest ID is the upper part tag. The wireless tag communication device 201 determines that the wireless tag having the second smallest ID is the middle part tag. The wireless tag communication device 201 determines that the wireless tag with the largest ID is the lower part tag. When writing data on a plurality of sheets, the wireless tags provided on the sheets to which data is to be written next can also satisfy the upper part tag ID<middle part tag ID<lower part tag ID relationship while each being larger than the values of a previous sheet. As a result, the wireless tag communication device 201 can specify the position information while keeping all the IDs different for the plurality of sheets.

In this way, the wireless tag communication device 201 can specify the wireless tag positions by defining the magnitude relationship of the IDs of the wireless tags on each sheet according to the position where the wireless tag is provided on the sheet. Thereby, the wireless tag communication device 201 can write data to the wireless tags according to the position of each wireless tag on the sheet.

Figure 9:
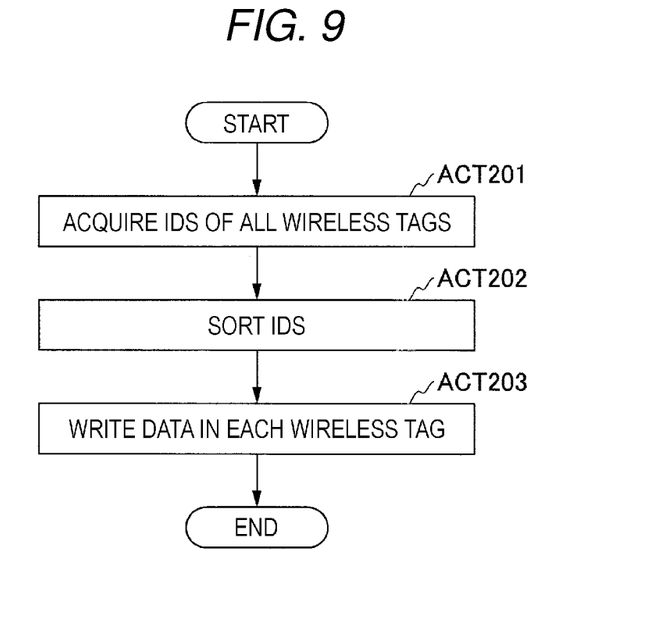
FIG. 9 is a flowchart of a second control process of a tag writing operation.

FIG. 9 is a flowchart showing the flow of the second control by the wireless tag communication device 201. The processing shown in FIG. 9 is started by an instruction from the control unit 100. The wireless tag communication device 201 acquires the IDs of all wireless tags (ACT 201). The wireless tag communication device 201 then sorts the acquired IDs (ACT 202) by magnitude. As a result, the magnitude relationship of IDs can be determined. The wireless tag communication device 201 then writes data to the wireless tags (according to position on the sheets as established by magnitude of the respective IDs) (ACT 203) and ends the process. Specifically, the wireless tag communication device 201 writes the upper part data to the wireless tag having the smallest ID. The wireless tag communication device 201 writes the middle part data to the wireless tag having the second smallest ID. The wireless tag communication device 201 writes the lower part data to the wireless tag having the largest ID.

In the second control described above, the entire ID is regarded as a numerical value, but the present disclosure is not limited thereto. For example, only four digits from the fifth lower digit to the eighth lower digit of the ID may be extracted and the four digits may be regarded as a numerical value. Although the tag having the smallest ID is used as the upper part tag, any correspondence between the magnitude relationship and the position may be used as long as the position can be specified by the magnitude relationship. For example, contrary to the above example, a wireless tag having the smallest ID may be the lower part tag or the wireless tag having the largest ID may be the upper part tag.

Next, a control (hereinafter, referred to as "third control") that regards the ID as a bit string will be described. The third control is control for specifying the position of the wireless tag by a specific field in the tag ID values.

In the description of the third control, the sheet S shown in FIG. 4 will again be used as an example.

Figure 10:
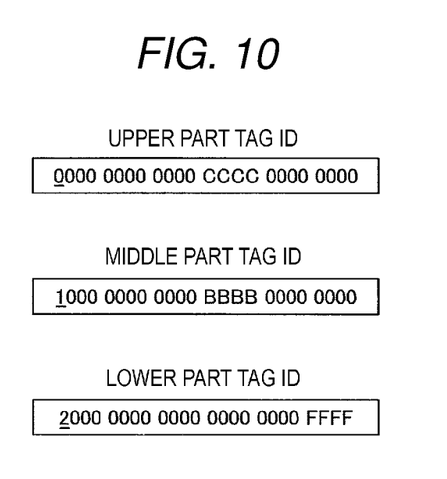
FIG. 10 depicts examples of an upper part tag ID, a middle part tag ID, and a lower part tag ID.

FIG. 10 is a diagram showing an example of the upper part tag ID, the middle part tag ID, and the lower part tag ID. In the third control, as indicated by the underlined portion of the ID shown in FIG. 10, the upper 4 bits (first upper digit) of the ID are used as a specific field.

When looking at the specific field in the IDs shown in FIG. 10, the field of the upper part tag ID is 0. The field of the middle part tag ID is 1. The field of the lower part tag ID is 2.

The wireless tag communication device 201 thus determines that the wireless tag whose field is 0 is the upper part tag. The wireless tag communication device 201 determines that the wireless tag whose field is 1 is the middle part tag. The wireless tag communication device 201 determines that the wireless tag whose field is 2 is the lower part tag. When writing data on a plurality of sheets, the field of the upper part tag ID is 0, the field of the middle part tag ID is 1, and the field of the lower part tag ID is 2, in each of the plurality of sheets.

In this way, the wireless tag communication device 201 can specify the wireless tag by defining the values in the specific field of the ID of the wireless tags provided on each sheet as the position where the wireless tag is provided on the sheet. Thereby, the wireless tag communication device 201 can write data to the wireless tags according to position on the sheet.

Figure 11:
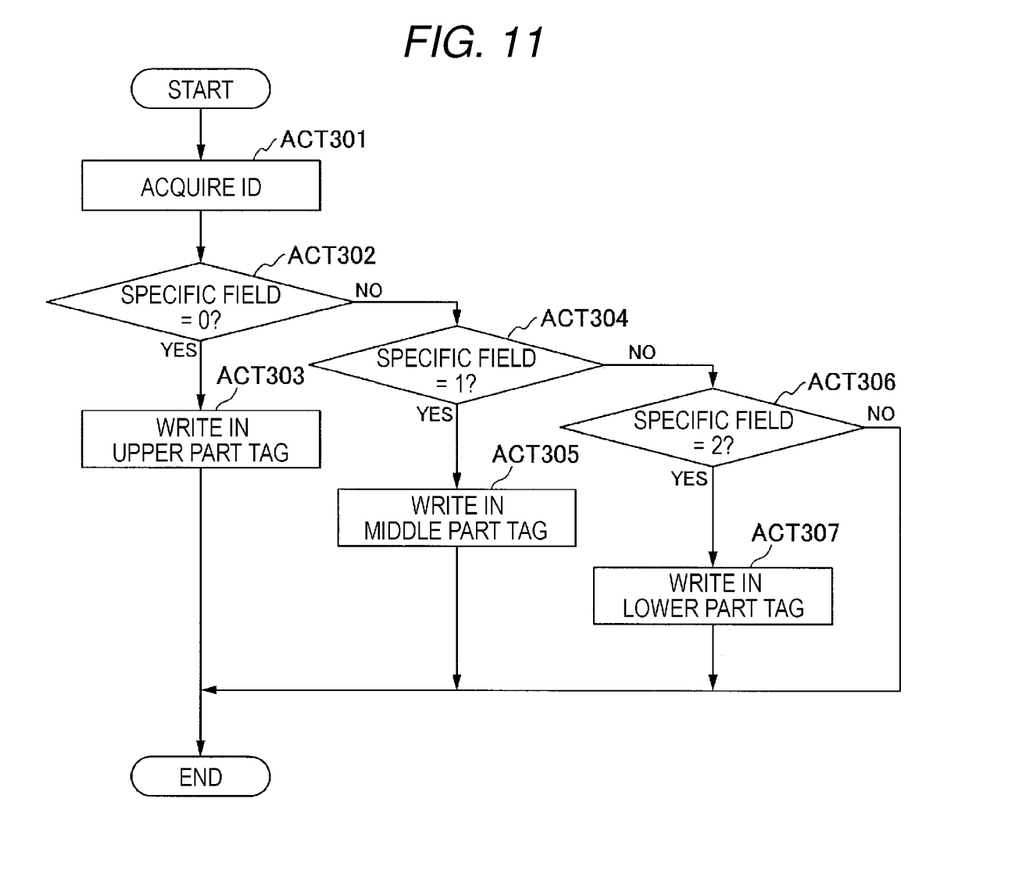
FIG. 11 is a flowchart of a third control process of a tag writing operation.

FIG. 11 is a flowchart showing the flow of the third control by the wireless tag communication device 201. The processing shown in FIG. 11 is started by an instruction from the control unit 100. In addition, this flowchart shows the flow when the ID is acquired three times. The wireless tag communication device 201 acquires an ID (ACT 301). The wireless tag communication device 201 determines whether or not the specific field of the acquired ID is 0 (ACT 302). If the field is 0 (ACT 302: YES), the upper part data is written in the upper part tag (ACT 303) and the process ends.

If the field is not 0 in ACT 302 (ACT 302: NO), the wireless tag communication device 201 determines whether or not the specific field of the acquired ID is 1 (ACT 304). If the field is 1 (ACT 304: YES), the middle part data is written in the middle part tag (ACT 305) and the process ends.

When the field is not 1 in ACT 304 (ACT 304: NO), the wireless tag communication device 201 determines whether or not the specific field of the acquired ID is 2 (ACT 306). If the field is 2 (ACT 306: YES), the lower part tag data is written in the lower part tag (ACT 307) and the process ends.

If the field is not 2 in ACT 306 (ACT 306: NO), the wireless tag communication device 201 ends the process without doing anything. If the field is neither 0, 1, nor 2, the acquired ID is abnormal, and thus, the process is terminated without doing anything.

In the flowchart shown in FIG. 11, the same ID may be acquired multiple times in ACT 301. When the ID of the wireless tag whose data was already written is acquired, the wireless tag communication device 201 ends the process without writing again. When the IDs are acquired from a plurality of wireless tags, the wireless tag communication device 201 writes the data to a wireless tag that was not previously written.

In the third control described above, the upper 4 bits are set as a specific field, but the present disclosure is not limited thereto. For example, four digits (16 bits) from the fifth lower digit to the eighth lower digit of the ID may be used as the specific field.

Next, the control (hereinafter referred to as "fourth control") that regards the ID as a bit string will be described. The fourth control is control for specifying the position of the wireless tag with two specific fields within the ID value.

In the description of the fourth control, the sheet S shown in FIG. 5 will be used as an example. The sheet S shown in FIG. 5 is provided with six wireless tags.

Figure 12:
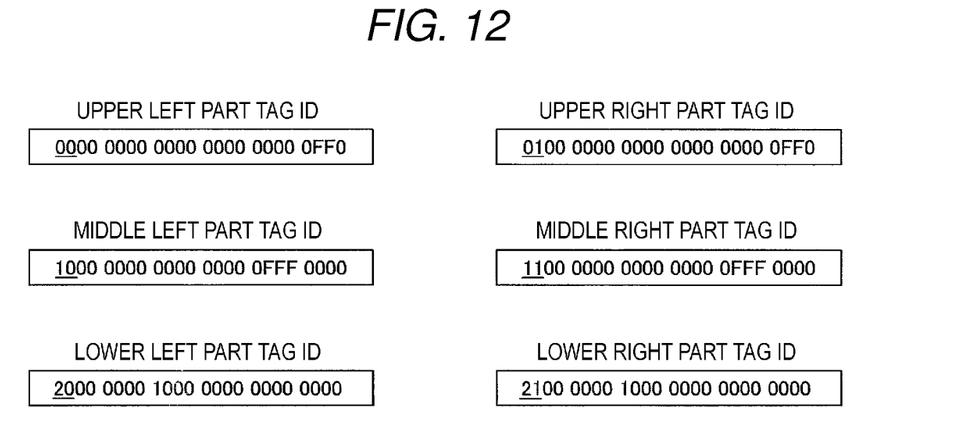
FIG. 12 depicts examples of an upper right part tag ID, a middle right part tag ID, a lower right part tag ID, an upper left part tag ID, a middle left part tag ID, and a lower left part tag ID.

FIG. 12 is a diagram showing an example of an upper right part tag ID, a middle right part tag ID, a lower right part tag ID, an upper left part tag ID, a middle left part tag ID, and a lower left part tag ID. In the fourth control, as shown by the underlined portion of the ID shown in FIG. 12, the upper 4 bits (first upper digit) out of the upper 8 bits of the ID and the lower 4 bits out of the upper 8 bits of the ID (second upper digit) are specific fields. As described above, in the fourth control, the position is specified by the pair of the first upper digit and the second upper digit. In the following description, the values of the pair of the first upper digit and the second upper digit may be specified in the format of (first upper digit, second upper digit).

The two fields of the upper left part tag ID are (0, 0). The two fields of the middle left part tag ID are (1, 0). The two fields of the lower left part tag ID are (2, 0). The two fields of the upper right part tag ID are (0, 1). The two fields of the right middle part tag ID are (1, 1). The two fields of the lower right part tag ID are (2, 1).

In this way, in the fourth control, the position is specified by the pair of the first upper digit and the second upper digit. Since the first upper digit and the second upper digit are both 4 bits, they can take values from 0 to F. Therefore, in the fourth control, the positions of up to 256 wireless tags can be specified.

Figure 13:
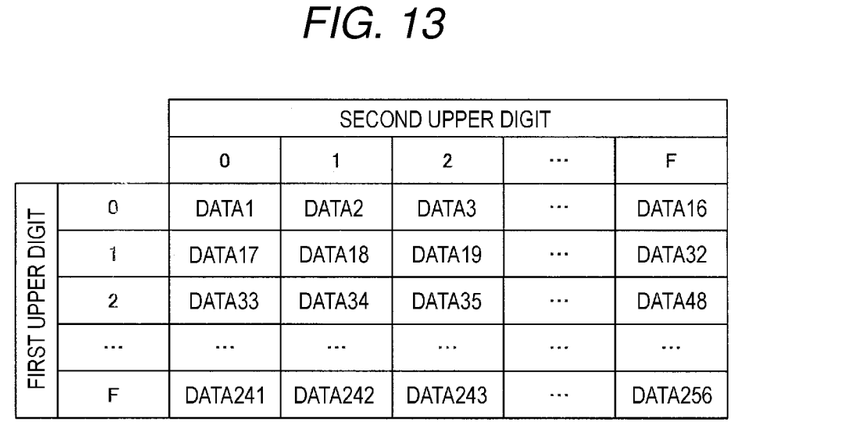
FIG. 13 is a diagram showing an example for storing 256 pieces of data.

FIG. 13 is a diagram showing an example of storing 256 pieces of data to be written in 256 wireless tags. The example of FIG. 13 shows a two-dimensional array specified by the values of the respective fields of the first upper digit and the second upper digit.

In this way, the wireless tag communication device 201 can specify the wireless tags by defining the values of the specific fields of the ID of the wireless tag according to the position where the wireless tag is provided on the sheet. Thereby, the wireless tag communication device 201 can write data in the wireless tags according to position of the wireless tag on the sheet. Furthermore, as in the fourth control, by preparing a plurality of specific fields, it is possible to specify the positions of more wireless tags. In addition, preparing a plurality of specific fields has the same meaning from the viewpoint of increasing the number of bits in one field and the amount of information. Therefore, in the third control, the specific field may be used for two digits, for example.

Figure 14:
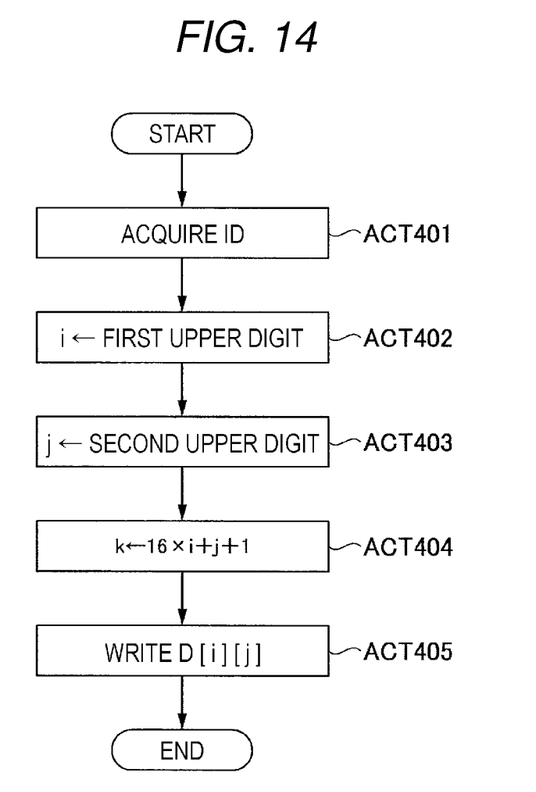
FIG. 14 is a flowchart of a fourth control process of a tag writing operation.

FIG. 14 is a flowchart showing the flow of the fourth control by the wireless tag communication device 201. The processing shown in FIG. 14 is started by an instruction from the control unit 100. In addition, this flowchart shows the processing when writing the data represented by the two-dimensional array as shown in FIG. 13. The two-dimensional array data value is represented by the notation D [i] [j], where the variable i indicates the value of the first upper digit and the variable j indicates the value of the second upper digit. Thus, wireless tag to which that data value D[i] [j] is to be written is the 16×i+j-th wireless tag.

The wireless tag communication device 201 acquires an ID (ACT 401). The wireless tag communication device 201 substitutes the first upper digit of the acquired ID for the variable i (ACT 402). The wireless tag communication device 201 substitutes the second upper digit of the acquired ID for the variable j (ACT 403). The wireless tag communication device 201 then substitutes 16×i+j into the variable k that specifies the wireless tag (ACT 404). The wireless tag communication device 201 then writes data D[i] [j] in the k-th wireless tag (ACT 405) and ends the process. The wireless tag communication device 201 repeats the processing shown in FIG. 14 until writing is completed on all the wireless tags provided on the sheet S.

With the fourth control, data can theoretically be written in up to 256 wireless tags as described above. However, generally there is a limit to the number of wireless tags to which data can actually be written during a normal operation time. Therefore, it is preferable to optimize the conveyance speed and the like according to the number of wireless tags to which data is to be written.

The processing of the flowcharts shown in FIGS. 7, 9, 11, and 14 is started by an instruction from the control unit 100 as described above. Specific start timings thereof include the timing at which the sheet is conveyed through the conveyance path 33a and the timing at which image formation is started. In the former case, the control unit 100 gives an instruction for each sheet being started.

In FIG. 4, a sheet provided with three wireless tags is illustrated, and in FIG. 5, a sheet provided with six wireless tags is illustrated. However, the number of wireless tags provided on the sheet is not limited to three or six. Further, the positions where the wireless tags are provided do not have to be equidistant from each other.

In the embodiments described above, the wireless tag communication device is provided in the image forming apparatus, but the present disclosure is not limited thereto. For example, the wireless tag communication device may be configured to be able to write data on a sheet with a wireless tag placed on a desk or the like. Alternatively, the wireless tag communication device can be configured to be portable. Thus, a person may hold the wireless tag communication device and write data on sheets with wireless tags by a human operation.

In the above-described embodiments, the wireless tag is provided on a sheet of paper or the like, but the present disclosure is not limited thereto. The wireless tags may be attached to, for example, luggage, and the wireless tag communication device according to the present embodiment may be installed on the conveyance path of the luggage. The frequency used by the wireless tag communication device may be any frequency such as LF band, HF band, UHF band, or microwave.

The functions of a wireless tag communication device in the above-described embodiments may be realized by a computer. In this case, a program for realizing these functions may be recorded in a non-transitory computer-readable recording medium, and the program may be read by a computer system and executed by a processor or processors thereof. In this context, a "computer system" can include an operating system (OS) and hardware such as peripheral devices. A "computer-readable recording medium" refers in this context to a portable medium such as a flexible disk, a magneto-optical disk, a ROM, a CD-ROM, or a storage device such as a hard disk built in a computer system. Further, the "computer-readable recording medium" may be accessible via communication line or a network such as the Internet or a telephone line. The "computer-readable recording medium" may be a server or a client terminal. Furthermore, the functions of a wireless tag communication device may be realized by combinations of software and hardware or by combinations of programs working in conjunction with one another including a program or programs already recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag communication device, comprising:
a controller configured to:
acquire, from a wireless tag on a sheet, position information indicating a position of the wireless tag on the sheet,
identify the position of the wireless tag on the sheet from the acquired position information, and
write information to the wireless tag according to the identified position of the wireless tag on the sheet, wherein,
the position information is provided as part of an identification response value from the wireless tag,
the identification response value is handled by the controller as a numerical value, and the position of the wireless tag on the sheet is identified from a remainder value generated when the identification response value is divided by the total number of wireless tags on the sheet.

2. The wireless tag communication device according to claim 1, wherein the total number of wireless tags on the sheet is determined by counting the number of unique identification response values received in response to an interrogation signal.

3. The wireless tag communication device according to claim 1, wherein the wireless tag is a radio frequency identification (RFID) tag.

4. The wireless tag communication device according to claim 1, wherein the controller comprises a central processing unit.

5. The wireless tag communication device according to claim 1, wherein the controller comprises an application specific integrated circuit.

6. An image forming apparatus, comprising:
a printer unit configured to print on a sheet; and
a wireless tag communication device configured to:
acquire, from a wireless tag on the sheet, position information indicating a position of the wireless tag on the sheet,
identify the position of the wireless tag on the sheet from the acquired position information, and
write information to the wireless tag according to the identified position of the wireless tag on the sheet, wherein the position information is provided as part of an identification response value from the wireless tag,
the identification response value is handled by the wireless tag communication device as a numerical value, and
the position of the wireless tag on the sheet is identified from a remainder value generated when the identification response value is divided by the total number of wireless tags on the sheet.

7. The image forming apparatus according to claim 6, wherein the total number of wireless tags on the sheet is determined by counting the number of unique identification response values received in response to an interrogation signal.

8. The image forming apparatus according to claim 6, wherein the printer unit prints an image on the sheet using toner.

9. The image forming apparatus according to claim 6, wherein the sheet is a label sheeting including a plurality of labels, each label including a wireless tag.

10. The image forming apparatus according to claim 6, wherein the wireless tag is a radio frequency identification (RFID) tag.

11. The image forming apparatus according to claim 6, wherein the wireless tag communication device comprises a central processing unit.

12. The image forming apparatus according to claim 6, wherein the wireless tag communication device comprises an application specific integrated circuit.

\* \* \* \* \*